United States Patent [19]
Makita

[11] Patent Number: 5,675,821
[45] Date of Patent: Oct. 7, 1997

[54] DOCUMENT PROCESSING APPARATUS AND METHOD

[75] Inventor: Masaru Makita, Tokyo, Japan

[73] Assignee: Canon Kabushiki Kaisha, Tokyo, Japan

[21] Appl. No.: 464,379

[22] Filed: Jun. 5, 1995

Related U.S. Application Data

[62] Division of Ser. No. 441,059, May 15, 1995, which is a division of Ser. No. 296,978, Aug. 26, 1994, abandoned, which is a continuation of Ser. No. 959,477, Oct. 9, 1992, abandoned, which is a continuation of Ser. No. 430,953, Nov. 1, 1989, abandoned, which is a continuation of Ser. No. 798,322, Nov. 15, 1985, abandoned.

[30] Foreign Application Priority Data

| Nov. 16, 1984 | [JP] | Japan | 59-240584 |
| Nov. 16, 1984 | [JP] | Japan | 59-240585 |
| Nov. 16, 1984 | [JP] | Japan | 59-240586 |
| Nov. 16, 1984 | [JP] | Japan | 59-240587 |

[51] Int. Cl.⁶ .................................................. G06F 17/21
[52] U.S. Cl. ................................. 395/795; 395/794; 400/63; 400/83
[58] Field of Search .................................... 395/800, 425, 395/494, 795, 794; 364/419; 400/63, 83

[56] References Cited

U.S. PATENT DOCUMENTS

| 4,136,395 | 1/1979 | Kolpek et al. | 364/518 |
| 4,328,561 | 5/1982 | Convis et al. | 364/900 |
| 4,342,085 | 7/1982 | Glickman et al. | 364/300 |
| 4,383,307 | 5/1983 | Gibson, III | 364/900 |
| 4,386,416 | 5/1983 | Giltner et al. | 364/900 |
| 4,453,217 | 6/1984 | Boivie | 364/300 |
| 4,456,969 | 6/1984 | Herzik et al. | 364/900 |
| 4,624,587 | 11/1986 | Ueno et al. | 400/83 |
| 4,651,300 | 3/1987 | Suzuki et al. | 364/900 |
| 4,671,684 | 6/1987 | Kojima et al. | 400/63 |
| 4,672,571 | 6/1987 | Bass et al. | 364/900 |
| 4,674,065 | 6/1987 | Lange et al. | 364/900 |
| 4,689,768 | 8/1987 | Heard et al. | 364/900 |
| 4,701,851 | 10/1987 | Bass et al. | 364/419 |
| 4,704,703 | 11/1987 | Fenwick | 364/900 |
| 4,775,251 | 10/1988 | Suzuki et al. | 400/63 |

OTHER PUBLICATIONS

Atspeller For AtariWriter, Kistler, S. p. 28 (1983).
IBM Technical Disclosure Bulletin, "Document Supplement for Spelling Verification," Hamilton, et al., vol. 23, No. 10, p. 4818 (Mar. 1981).
IBM Technical Disclosure Bulletin, "Automatic Spelling Verification Method," Herbert, et al., vol. 22, No. 5, p. 1783 (Oct. 1979).
IBM Technical Disclosure Bulletin, "Spelling Processing Functions Operator Interface," Adam, et al., vol. 24, No. 10, pp. 5003–5008 (Mar. 1982).

*Primary Examiner*—Larry D. Donaghue

[57] ABSTRACT

A word processor bearing a spelling verification function which is achieved in more efficient manner through the use of an independent control unit. The capacity of a text buffer memory can be reduced, as the entered text is verified word by word, and each verified word is stored as a code in the memory to economize on the capacity.

10 Claims, 12 Drawing Sheets

(a)

(b)

(c)

(d)

DOCUMENT PROCESSING APPARATUS AND METHOD

This application is a divisional application of Ser. No. 08/441,059, filed May 15, 1995, which is a divisional of application Ser. No. 08/296,978, filed Aug. 26, 1994, now abandoned, which is a continuation of application Ser. No. 07/959,477, filed Oct. 9, 1992, now abandoned, which is a continuation of application Ser. No. 07/430,953, filed Nov. 1, 1989, now abandoned, which is a continuation of application Ser. No. 06/798,322, filed Nov. 15, 1985, now abandoned.

BACKGROUND OF THE INVENTION

1. Field of the Invention

The present invention relates to a word processor, and more particularly to a word processor with a spelling verification function for the words entered by keyboard.

2. Description of the Prior Art

In recent years, word processors have become available in compacter form and are attaining wider popularity. So-called electronic typewriters have shown remarkable progress with new functions supported by electronic technology, while maintaining the traditional functions a typewriter. One of such new functions is spelling verification which provides the advantage of correcting the text as its is entered each entered word is verified by a dictionary in the typewriter and the operator is immediately informed of any misspelling.

However this function has a very large memory for the dictionary, thus leading to a higher cost and larger dimension typewriter, and requires a certain time for processing.

Also a dictionary containing only ordinary words is unable to handle proper nouns such as human names, and special technical texts, and the verification errors caused in these cases are rather inconvenient for the operator.

SUMMARY OF THE INVENTION

In consideration of the foregoing, an object of the present invention is to avoid such drawbacks and to provide a compact and inexpensive word processor with improved performance, in which the capacity of the text memory can be significantly reduced by effective utilization of a dictionary containing ordinary words only.

Another object of the present invention is to provide a word processor provided with a control unit for spelling verification and another control unit for word processing.

Still another object of the present invention is to provide a word processor with improved operability through effective utilization of a dictionary of ordinary words and through anticipation of entry of proper nouns such as human names.

Still another object of the present invention is to provide a word processor in which the capacity of the text memory is significantly reduced and operability is improved through effective utilization of a dictionary of ordinary words.

Still another object of the present invention is to provide a word processor capable of various operating modes, such as a spelling verify mode for each entered word and a text compression mode by conversion of each word into an identification code, according to the purpose of use, through effective utilization of a dictionary of ordinary words.

Still another object of the present invention is to provide a word processor capable of efficiently handling a large amount of text information with a limited memory capacity.

DETAILED DESCRIPTION OF THE PREFERRED EMBODIMENTS

Now the present invention will be clarified in detail by embodiments thereof shown in the attached drawings.

Figure 1:
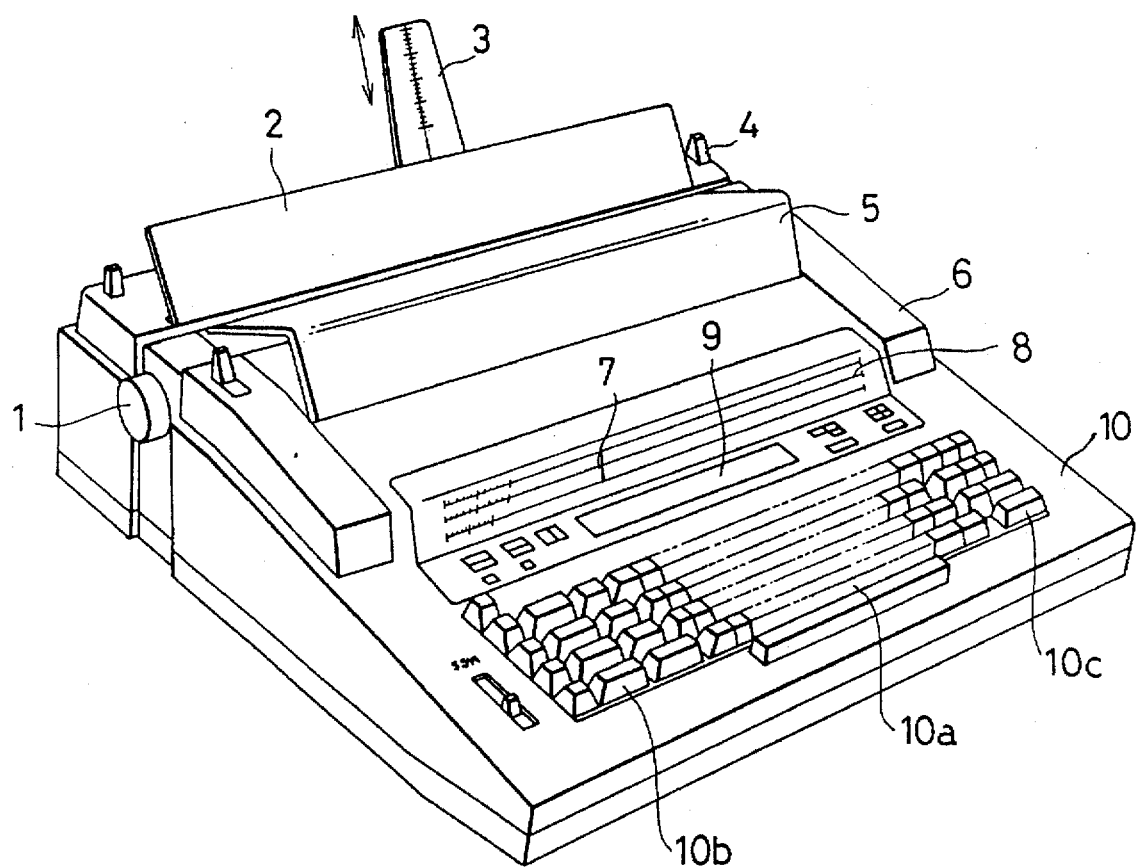
FIG. 1 is an external perspective view of an electronic typewriter embodying the present invention.

FIG. 1 is an external perspective view of an electronic typewriter embodying the present invention, wherein a platen knob 1 is used for manual loading of a typewriting sheet or for fine adjustment of the printing position in the vertical direction. When pushed inwards, the platen knob 1 is disengaged from internal coupling with a stepping motor and can be manually rotated. A paper support 2 guides the typewriting sheet and directs the printed texts toward the operator even when a thin paper is used. A page end indicator 3 is a scale indicating the length of paper to the last line of printing, and is vertically adjusted in advance, as indicated by arrows, by the operator according to the length of typewriting sheet, 10 so that the operator can know the length of sheet to the last printing line when the upper end of the sheet reaches the marks on indicator 3. A release lever 4 releases pinch rollers, positioned under the platen, from the platen and is manipulated in case the position of the typewriting sheet has to be manually corrected. A noise cover 5, for shielding noises of impact printing, is composed of a transparent resin so that the printed characters can be seen through the cover. Cover 6 can be opened by rotation to the back, for replacing a ribbon cartridge or changing a type-font wheel, mounted on a carriage, to another font. The present electronic typewriter provides three printing pitches: 10, 12 and 15 characters per inch, and a proportional spacing in which the printing pitch is variable according to the size of each character. A scale 8 has three gradations in 10, 12 and 15 characters per inch. A carriage indicator 7 is composed- .for example of three light-emitting diodes or lamps, which are mounted on the carriage, and one of the lamps corresponding to the printing pitch selected by the keyboard 10 is lit to indicate the position of the carriage on the scale 8. The keyboard 10 is composed of a group of character keys 10a for entering and printing characters, and groups of control keys 10b, 10c placed on both sides.

Figure 2:
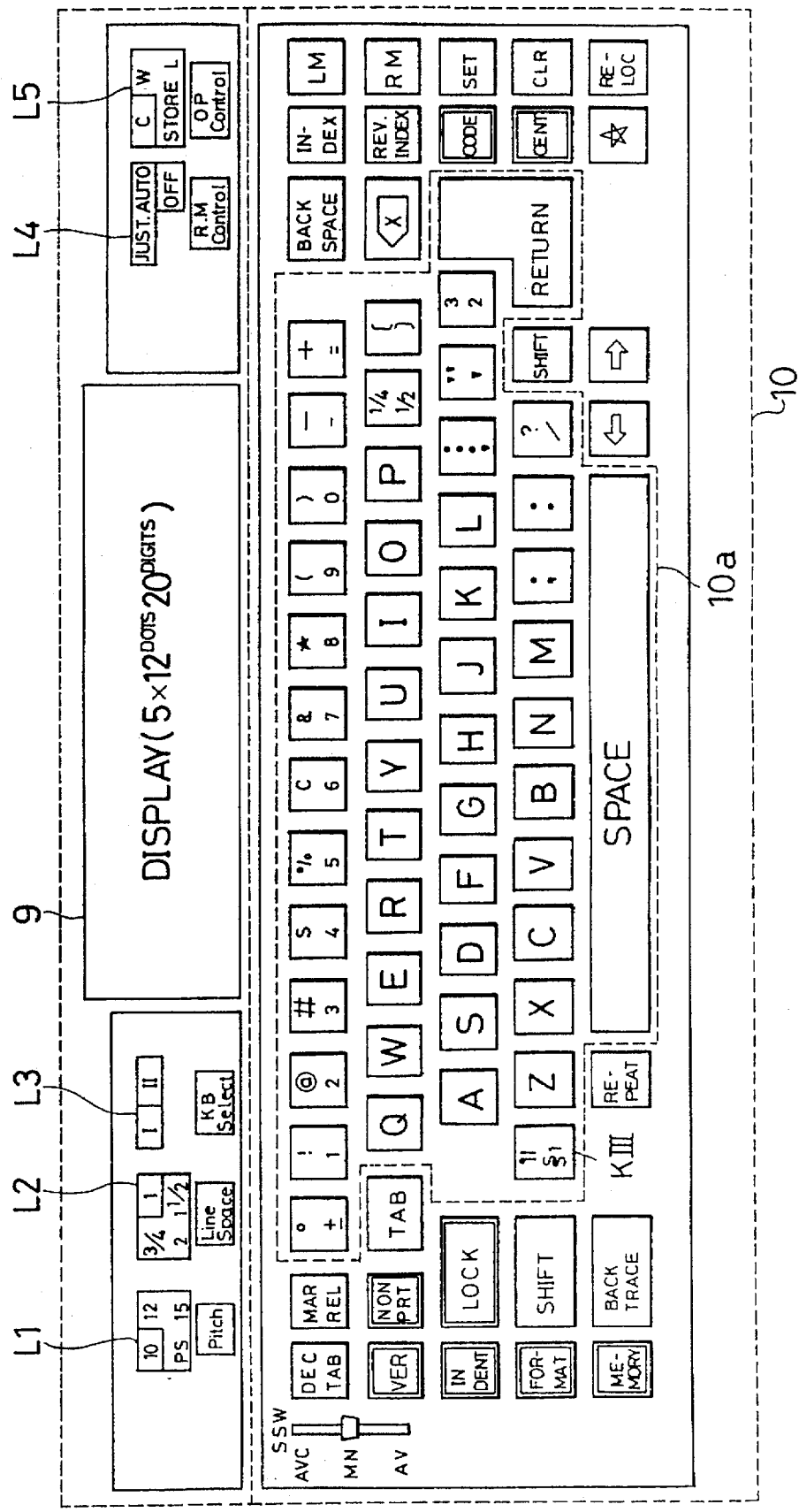
FIG. 2 is a front view of an operation panel of the electronic typewriter.

FIG. 2 is a front view of an operation panel of the electronic typewriter. A PITCH key is used for selecting the number of characters printed per inch, and in response to actuations of this key, lamps such as light-emitting diodes, constituting a display unit L1 are cyclically lighted in the order of '10', '12', '15' and 'PS' wherein the firstthree represent the number of characters per inch, while PS stands for proportional spacing in which the number of characters per inch is variable according to the characters to be printed. A LINE SPACE key selects the amount of line feed, the basic unit of which is 1/6 inches, and lamps of a display unit L2 are cyclically lighted as explained above, in response to the actuations of this key. A KB SELECT key selects a third character on a key which represent three characters, such as a key KIII, that cannot be selected by SHIFT key alone. A R.M CONTROL key selects the function of the typewriter at the right-end margin, and a display unit L4 cyclically shows JUST, AUTO or OFF in response to the actuations of this key. JUST indicates a mode of right-end justification or alignment, while AUTO indicates a mode of automatic line feed, and OFF indicates the absence of instruction. An OP CONTROL key selects the printing mode of the electronic typewriter. A mode indicator lamp C, W, L or STORE is lighted in response to the actuation of the key. C indicates printing for every character; W indicates printing for every word; L indicates printing for every line; and STORE indicates storage into a text buffer TB, in which case the printing is effected in the line printing mode L. A MEMORY key is used for processing a text and initiates the function of memory. A margin release key MARREL releases a margin stop state in which key entry is prohibited, and is also used for releasing in case of a spelling verification error in a word entry to be explained later. A relocation key RELOC is used for repeated spelling verification for a corrected word. A lever switch SSW selects one of three operating modes of the present embodiment. When it is positioned at a manual mode MN, the spelling of a word entered immediately before is verified in response to the actuation of a verify key VER. When it is positioned at an automatic verification mode AV, the spelling of a word is automatical verified after it is entered, when the operator actuates the SPACE key. In these two modes, if storage into the internal text buffer is selected in the STORE mode, the character codes of the entered word are stored in the text buffer TB without change. On the other hand, when the lever switch is positioned at an automatic conversion mode AVC, the spelling of a word is automatically verified at the entry of each word, and, at the same time, the character codes of the word is converted into a word identification code ID. In this mode, if the STORE mode is selected, the converted identification code ID is stored in the text buffer TB.

Figure 3:
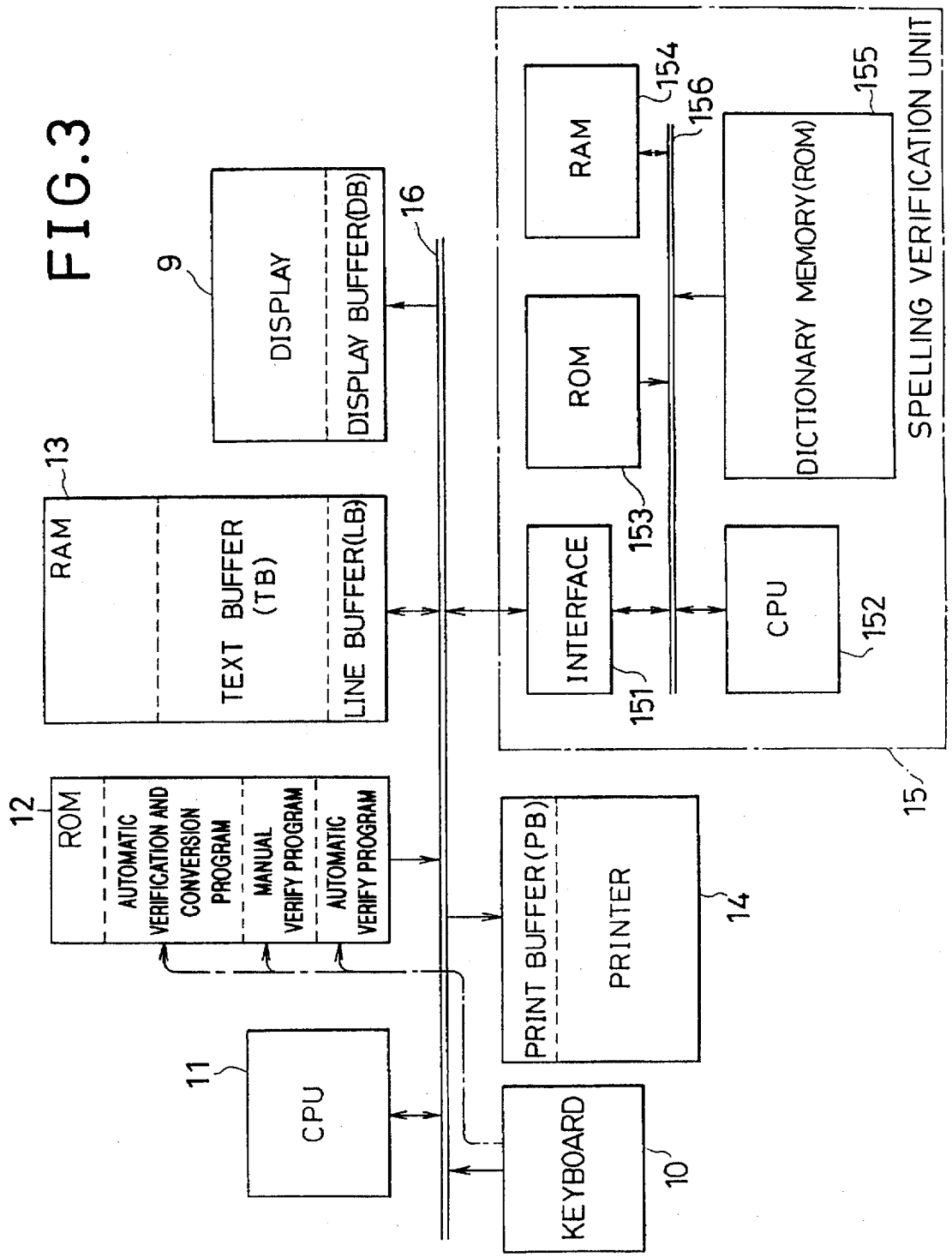
FIG. 3 is a block diagram of the electronic typewriter.

FIG. 3 is a block diagram of the electronic typewriter, in which the same components as those in FIG. 1 are represented by same numbers and will be omitted from the following explanation.

In FIG. 3 there are provided a central processing unit (CPU) 11 for performing the main control of the electronic typewriter; a read-only memory (ROM) 12 storing the programs, shown in FIGS. 6 to 9, to be executed by the CPU 11; a random access memory (RAM) 13 for temporarily storing text data entered by the keys and other data required for controlling the typewriter; a printer unit 14 for printing the text data; a spelling verification unit (SVCU) 15 for verifying the spelling of the key entered words and performing conversion between the character codes and the word identification code; and an internal bus line 16 for connecting the above-mentioned various units to the CPU 11.

It is also possible to communicate data with another electronic typewriter or the like by connecting an unrepresented serial interface to the internal bus line 16.

The spelling verification unit (SVCU) 15 is provided, for achieving complex functions with a simple structure, with a central processing unit (CPU) 152 for main control; a read-only memory (ROM) 153 storing control programs, shown in a part of FIGS. 6 to 9, of CPU 152; a random access memory (RAM) 154; a dictionary ROM 155 storing the spellings of a very large number of words as a table; an internal bus line 156 for connecting the above-mentioned units with the CPU 152; and an interface 151 for connecting the entire SVCU 15 to the internal bus line 16 of the typewriter.

Figure 4:
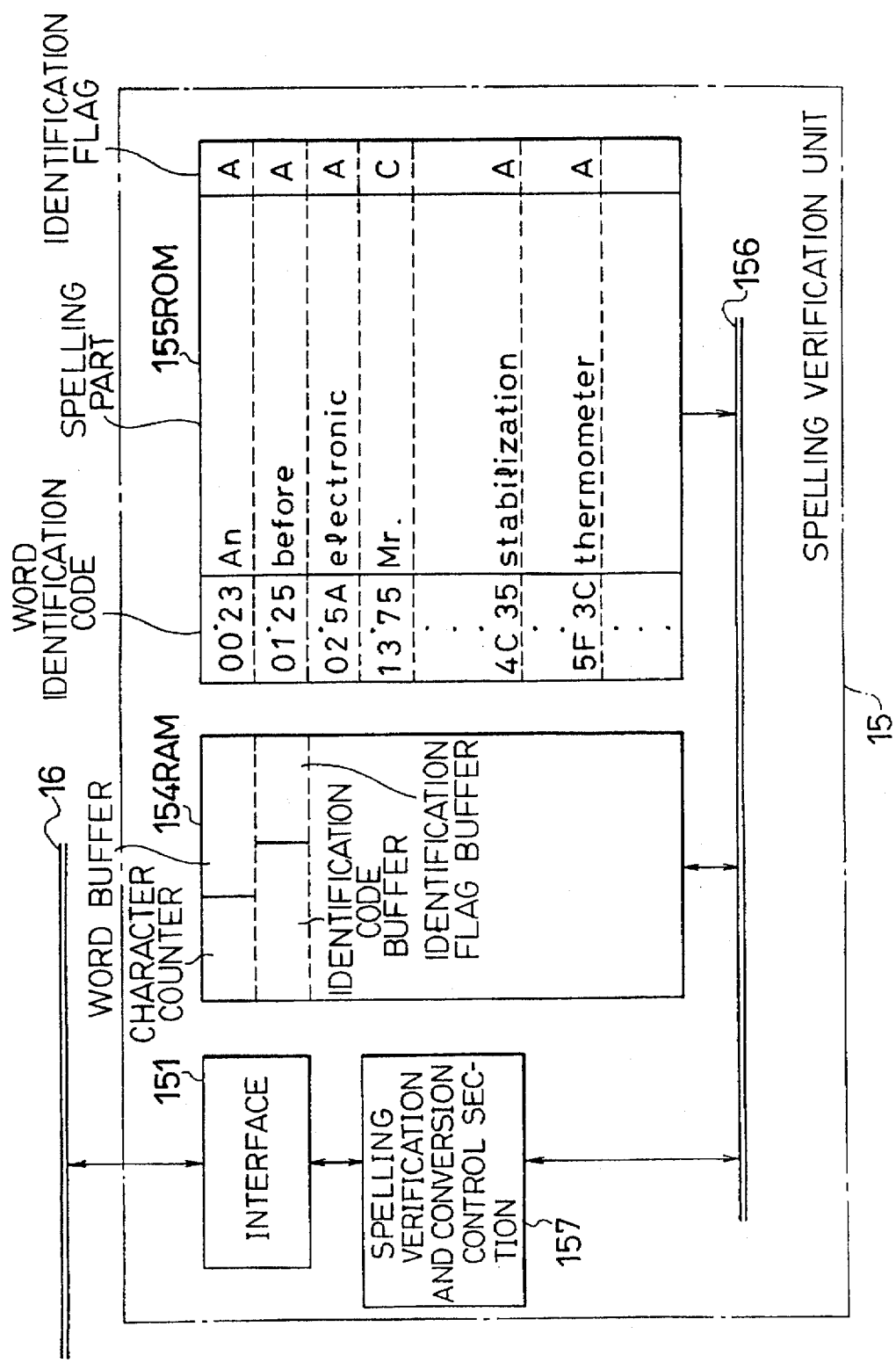
FIG. 4 is a functional block diagram of a spelling verify unit SVCU 15 shown in FIG. 3.

FIG. 4 is a functional block diagram showing the functions of the spelling verification unit (SVCU) 15 shown in FIG. 3. In FIG. 4 there is shown a spelling verification and conversion control unit (SVCC) 157 which is composed of the CPU 152 and ROM 153 shown in FIG. 3, and which performs control for the spelling verification on the key entered words according to key entered data and other various instruction data supplied from the electronic typewriter through the interface 151, control for conversion from entered words into word identification codes ID for forming text data with such identification codes in the text buffer TB, and control for inverse conversion from the identification codes ID read from the text buffer TB into the character codes for printing. For achieving such control functions, the RAM 154 is provided with a character counter CC for counting the number of key-entered character data supplied from the electronic typewriter, a word buffer WB for storing the spelling, or the character code data, of a word, a code buffer IDB for storing the word identification codes ID, and a flag buffer IDFB for storing the category of the word. FIG. 4 also shows an example of the dictionary memory 155. As shown in FIG. 4, data for each word consists of the combination of a spelling part SP, a word identification code ID, and an identification flag IDF representing a category code attached to each word, and such data for plural words are stored as a table. Consequently the SVCC 157 can search dictionary memory 155 by the spelling part SP or by the word identification code ID.

In this manner high-speed control can be achieved by the use of two control units for spelling verification and for word processing of the entire apparatus. Though the present embodiment is explained with spelling verification in the English language, the same principle can be applied to Japanese, German, French or any other language.

The apparatus of this kind is principally used for verifying the spelling of the key-entered data, and the apparatus of the present embodiment is for this purpose provided with the above-mentioned dictionary memory 155. However, one of the features of the present embodiment is to enable efficient word processing, fully utilizing such dictionary memory. This feature will be further explained in the following explanation.

Figure 5:
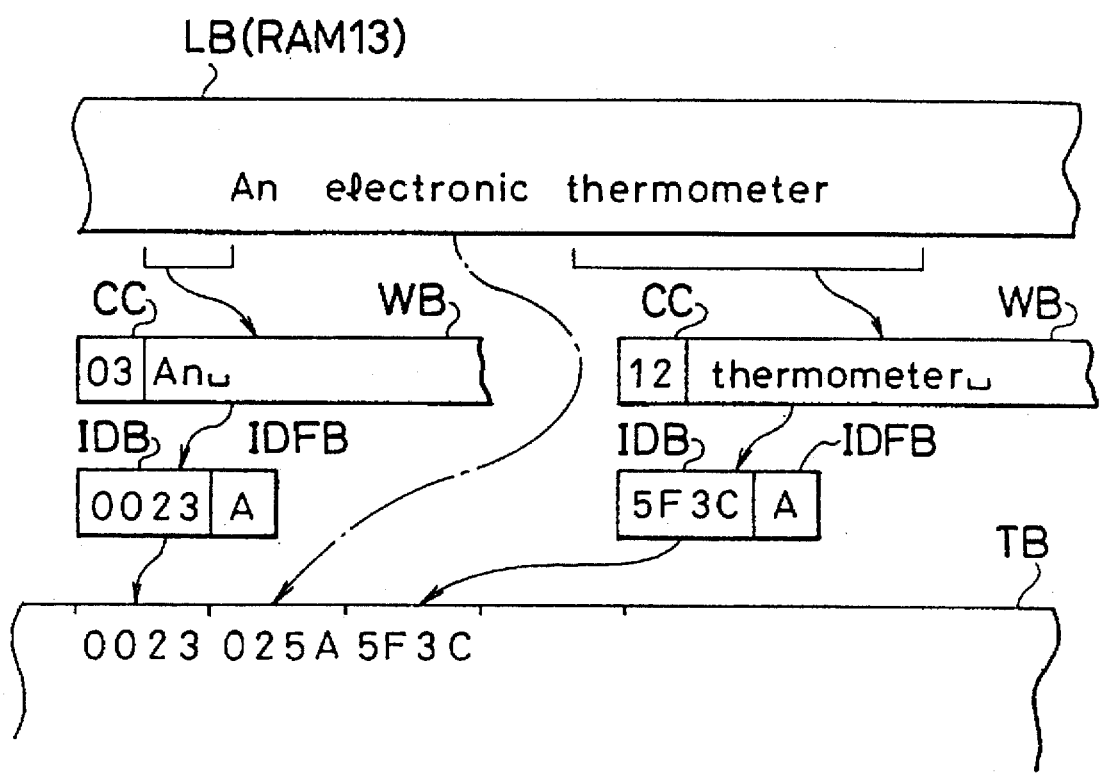
FIG. 5(a) is a conceptional view showing conversion of key entered words into identification codes.
FIG. 5(b) is a conceptional view showing automatic identification of proper nouns such as human names.
FIG. 5(c) is a conceptional view showing a process in case of an error in the key entry.
FIG. 5(d) is a conceptional view showing conversion of text data of identification codes ID in a text buffer TB into character code data for printing.
Figure 5:
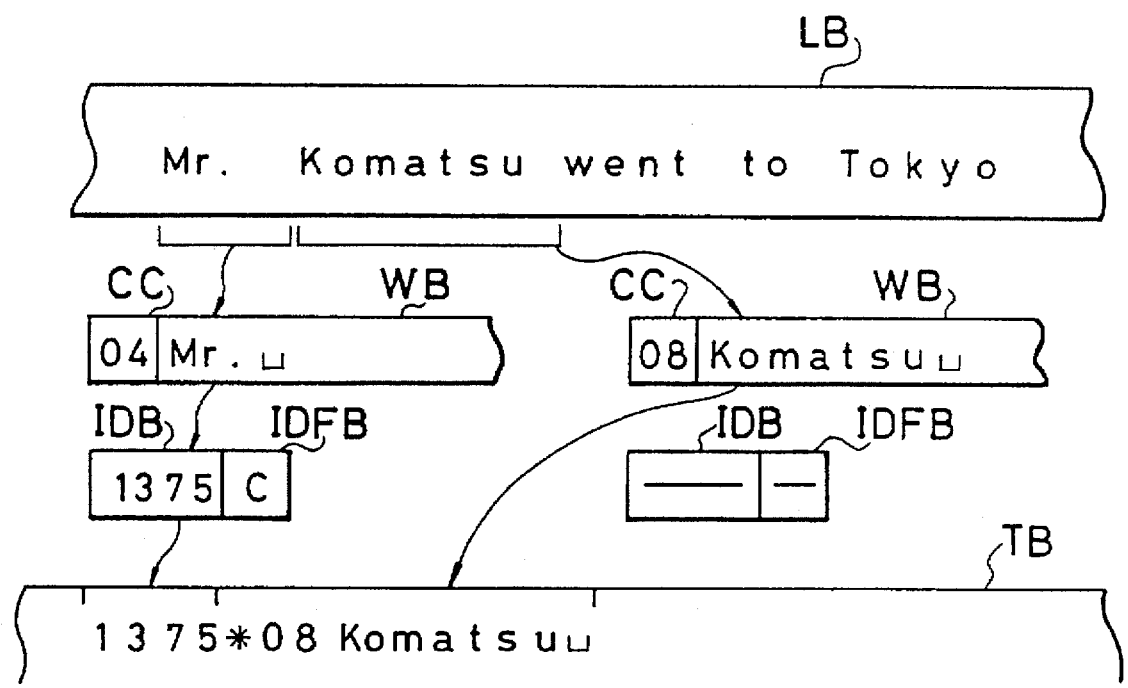
Figure 5:
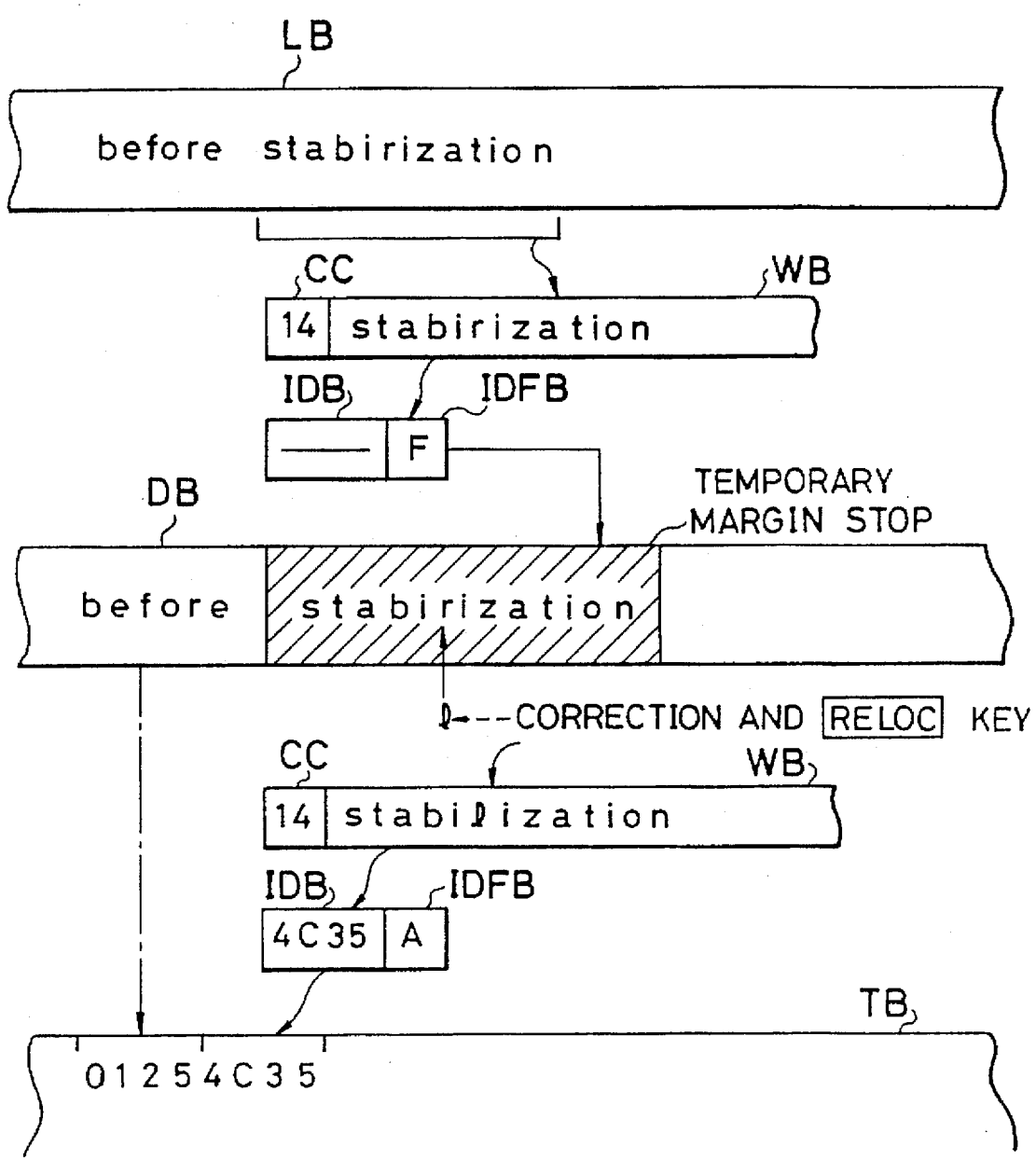
Figure 5:
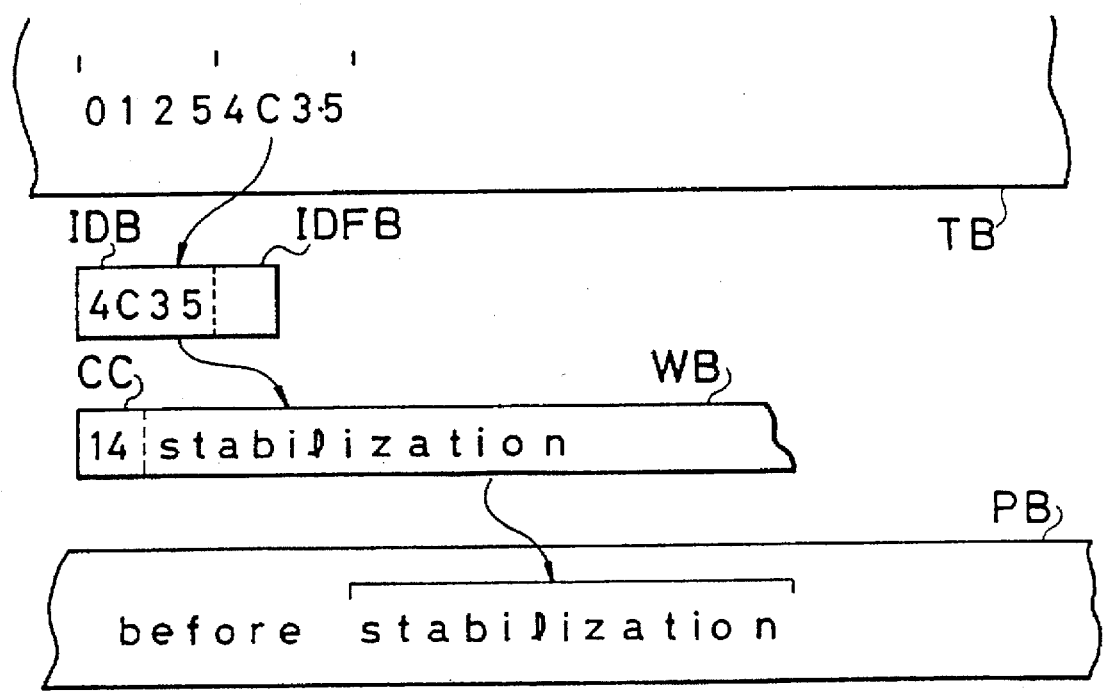

FIGS. 5(a)–(d) illustrate the function of the present embodiment. FIG. 5(a) shows the conversion of a key-entered word into a word identification code ID. In response to entries of the character keys of the keyboard 10, corresponding data are supplied, according to the respective purpose of processing, to a line buffer LB of the RAM 13, a display buffer DB of the display unit 9, and a word buffer WB of the SVCU 15. The line buffer LB is used for assembling the data of one line, while the display buffer DB is used for displaying 20 characters, and the word buffer WB is used for extracting a word for search in the dictionary or for spelling verification. The use of such word buffer WB for spelling verification independent from the line buffer LB and text buffer TB allows high-speed and independent word processing and spelling verification. In a mode of the present embodiment, a word is detected by the actuation of the SPACE key. Thus, in case a word "An" followed by the SPACE key is entered, the character counter CC counts the number of characters (2)+1 of the word, and the word buffer WB stores the spelling, or character codes, of the word. The SVCC 157 makes a search with the character code data in the dictionary memory 155, and a coinciding word "An" is found in the spelling part SP shown in FIG. 4. Thus a corresponding word identification code ID=0023H (H stands for hexadecimal) is stored in the buffer IDB while the category code IDF=A is stored in the flag buffer IDFB. The code "A" indicates the presence of the searched word in the dictionary, meaning that the identification code 0023H in the buffer IDB is effective. The CPU 11 of the electronic typewriter transfers the content of buffer IDB to the text buffer TB, and, the entered character data can therefore be stored into shorter word identification codes. Similar procedures are conducted for the ensuing words "electrOnic (+SPACE)" and "thermometer (+SPACE)" It is to be noted that the original key-entered data of 26 characters or 26 bytes are reduced to 12 digits or 6 bytes when stored in the text buffer TB.

FIG. 5(b) shows automatic identification of proper nouns such as human names or symbols and marks. In general, human names cannot be adapted to search in a dictionary. In the present embodiment, therefore, useless spelling verification is omitted for the entry of human names or the like. For this purpose it is required to anticipate the entry of a human name, since, otherwise, the human name may be identified after unnecessary search in the dictionary. In the present embodiment, therefore, it is rendered possible to identify certain abbreviations which usually precede human names. For example, if a word "Mr." is identified in the dictionary memory 155 shown in FIG. 4, the succeeding word should be a human name. Thus, in order to achieve the above-explained control, a category code C is given to the identification flag IDF of the word "Mr." in the present embodiment. A similar process can be conveniently applied by giving the same category code C to similar words such as "Mrs.", "Dr." etc. Also this concept can be easily applied to words other than proper nouns. Now referring to FIG. 5(b), after the search of the word "Mr." in the dictionary memory, the CPU 11 of the electronic typewriter identifies the identification flag C in the flag buffer IDFB to automatically exclude the following word from verification or code conversion. In such an operating mode, it becomes necessary to store text data already converted into the word identification codes and unconverted text data, mixedly in the text buffer TB. Thus, in the case of storing unconverted text data such as the above-explained proper nouns, in the text buffer TB, the CPU 11 attaches a particular mark "*" then inserts the content of the character counter CC in order to indicate the number of characters, and finally stores the character codes of the spelling through the buffer IDB.

FIG. 5(c) shows the procedure in case of an erroneous key entry. In the illustraged example, the first search in the dictionary provides a negative result since the word "stabirization" is misspelled and letter "r" should be "l". This result is indicated by IDF=F, wherein category F is given by the SVCC 157 which has detected the absence of the subject word in the dictionary. In response the CPU 11 of the electronic typewriter inverts the display of the word in the display buffer DB, and applies a temporary margin stop to the keyboard 10, thus forbidding the further movement of the cursor to the right, thus drawing attention of the operator. For this purpose there may also be employed flashing of the display or other suitable method. In this state the operator can return the cursor to the left, and is therefore capable of returning the cursor to the position of "r" and correcting it to "l". After the correction the operator actuates the RELOC key, whereby the search in the dictionary is effected again and a word identification code ID=4C35 and a category code IDF=A are respectively transferred to the buffers IDB, IDFB. At this point the CPU 11 transfers the content of IDB to the text buffer TB.

FIG. 5(d) shows a state of converting text data consisting of the word identification codes ID in the text buffer TB into character code data for printing. At first the word identification codes ID of the text buffer TB are transferred to the code buffer IDB in the RAM 154 of the SVCC. Then the CPU 11 supplies the SVCC 157 with an instruction for reverse conversion, whereby the SVCC 157 searches the dictionary memory 155 with a code ID=4C35 and stores a corresponding word "stabilization" in the word buffer WB. Subsequently the CPU 11 transfers these character codes to the print buffer PB for printing the characters in succession.

Manual Mode

As explained above, the apparatus of the present embodiment is provided with converting means for converting from character data to identification code data and converting means for converting from identification code data into character data, and is thus capable of storing text data in the text buffer TB in the form of shorter word identification codes ID. It is therefore rendered possible to significantly reduce the size of the text buffer, or to store a larger amount of text data in the text buffer of a given capacity. Also communication with another electronic typewriter or the like can be made very efficiently, since the text of a page can be transmitted very quickly because of the shorter length of data.

Figure 6:
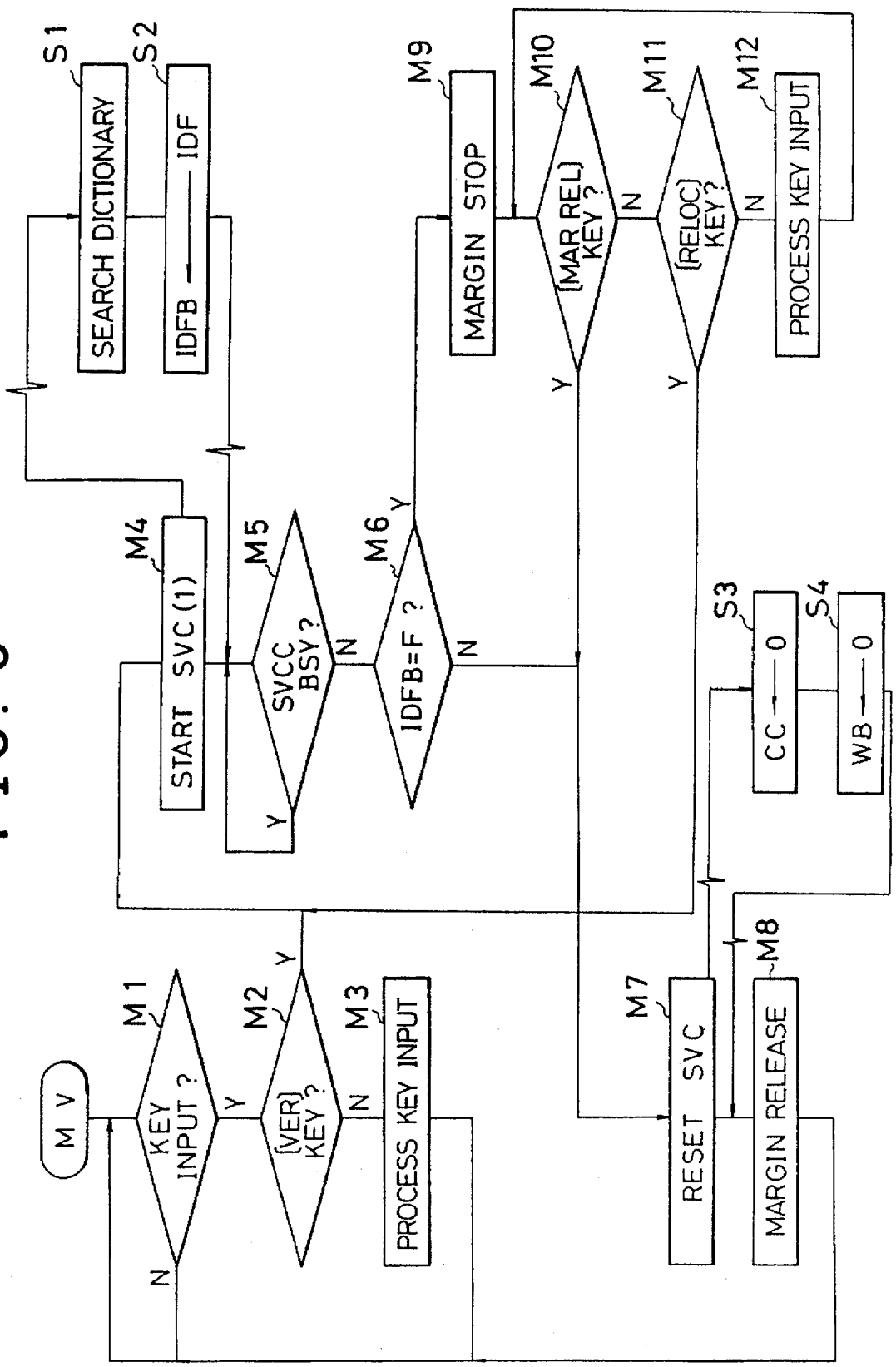
FIG. 6 is a flow chart showing a process when a slide switch on a keyboard 10 is positioned at manual mode MN.
Figure 7:
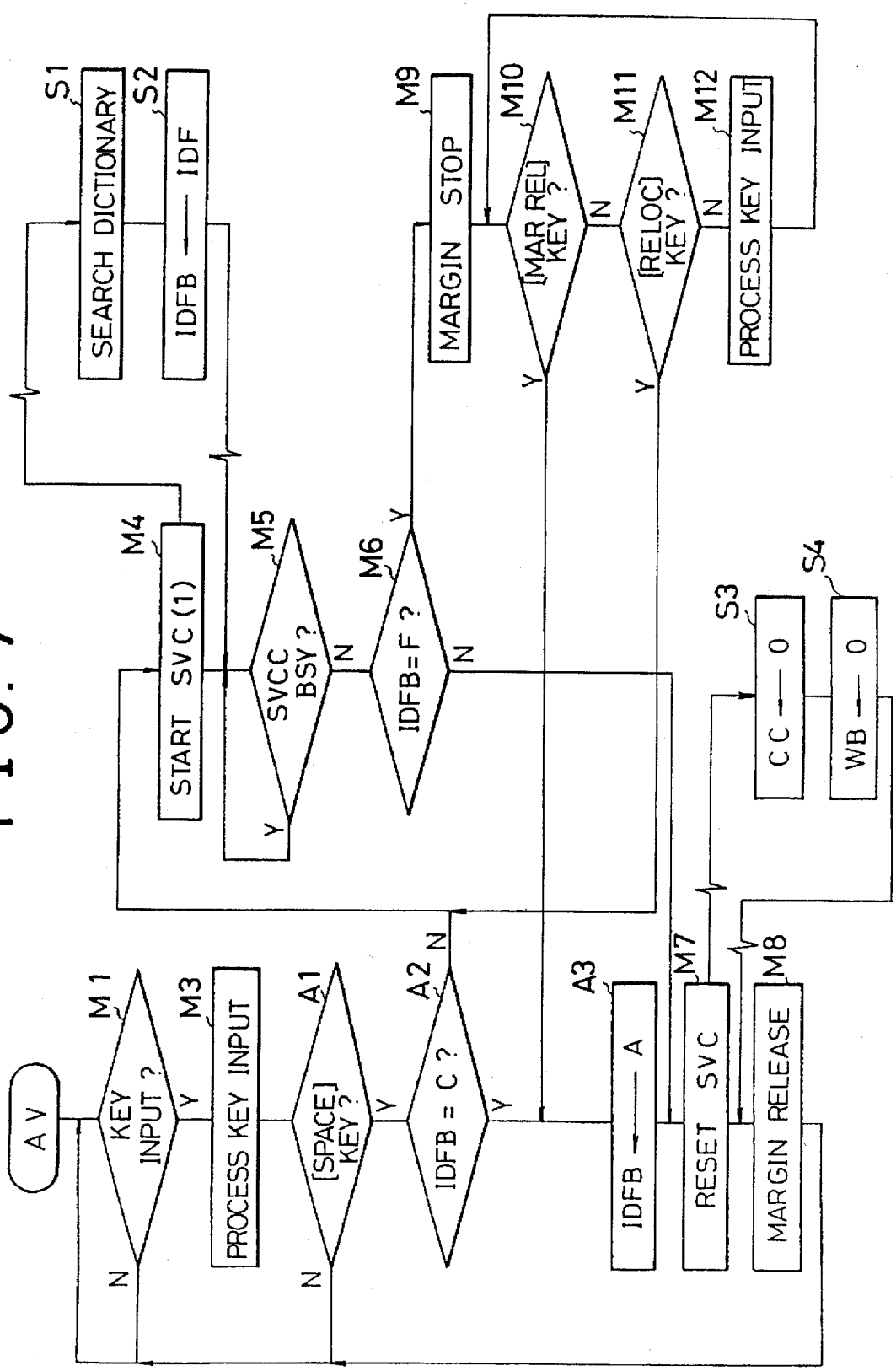
FIG. 7 is a flow chart showing a process in case the slide switch of the keyboard 10 is positioned at an automatic verify mode AV.
Figure 8:
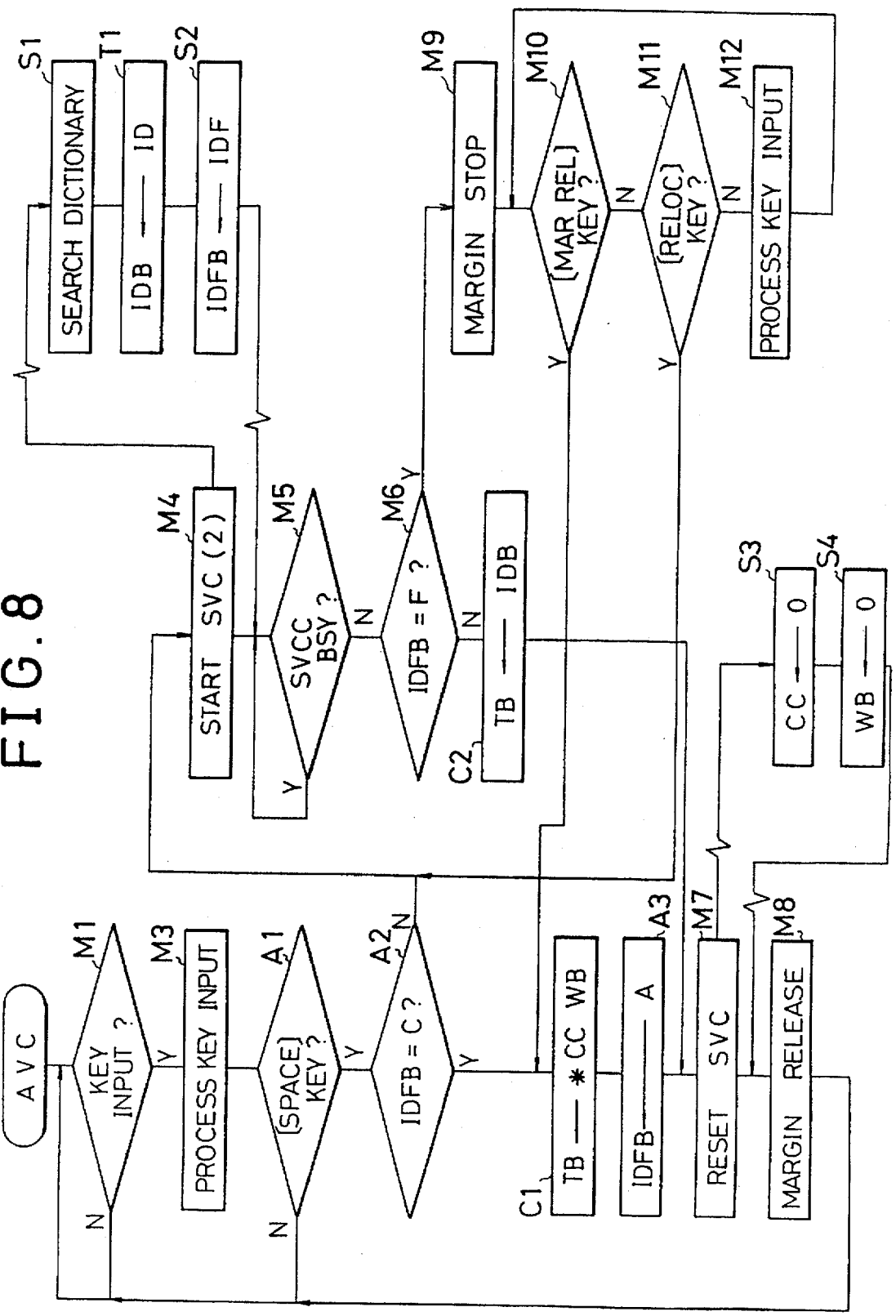
FIG. 8 is a flow chart showing a process in case the slide switch of the keyboard 10 is positioned at an automatic verify and conversion mode AVC.

FIGS. 6 to 8 are flow charts showing the control procedure of the CPU 11 in three operating modes of the present embodiment, wherein FIG. 6 shows the control procedure in case the lever switch on the keyboard 10 is positioned at the manual mode MN. A manual verify (MV) program is selected and activated in the ROM 12 by a mode selection signal from the keyboard 10 shown in FIG. 3. In this operating mode, the spelling verification is not conducted by the actuation of the SPACE key, but is conducted, in response to the actuation of the VER key, for an immediately preceding word. This operating mode allows key entries at high speed and is practically convenient since the verification can be selected only when needed, for example when the operator cannot be confident with the key entry operation. The VER key also has a function of forcedly dividing a word, and can therefore be utilized for cutting a word at an arbitrary position.

Referring to FIG. 6, a step M1 awaits a key entry. A subsequent step M2 identifies if the VER key has been actuated. If not, the program proceeds to a step M3 for a key input process, for example transferring the entered character code to the line buffer LB, display buffer DB and word buffer WB, or executing insertion, deletion, cursor movement etc. in response to a word processing key input. In case the VER key is actuated, the program proceeds to a step M4 to supply the SVCC157 with a "start SVC(1)" instruction, and a step M5 awaits the completion of the process in the SVCC 157. The process executed by the CPU 152 of the SVCC is represented by steps S1 and S2. The step S1 performs a search of the content of the word buffer WB in the dictionary memory 155, and the step S2 transfers a corresponding identification flag IDF to the flag buffer IDFB. When a step M5 identifies that the SVCC is no longer busy, a step M6 inspects whether the flag buffer IDFB contains a flag F. If the content is not F, indicating the presence of the searched word, the program proceeds to a step M7 for releasing an instruction of "SVC resetting", whereby the CPU 152 of the SVCC executes steps S3 and S4 to resets the character counter CC and the word buffer WB. Subsequently, in a step MS, the CPU 11 of the electronic typewriter executes a margin release to enable the movement of the cursor, and the program returns to the step M1 for awaiting the key entry.

On the other hand, if the step M6 identifies the content of the flag buffer IDFB as F, indicating the absence of the searched word, the program proceeds to a step M9 to apply a margin step, thus preventing the cursor from further advancement. However the cursor can be reversed for certain processes. A succeeding step M10 identifies if there has been actuated the margin release key MAR REL. The actuation of the margin release key indicates that the program should proceed to the entry of the next word, without being bothered with the spelling of the searched word. Thus the cursor movement is enabled and the program proceeds to the step M7. On the other hand, if margin release key MAR REL has not been actuated, a step M11 identifies whether the relocation key RELOC has been actuated. If the relocation key has been actuated, the dictionary memory is searched again. This procedure corresponds to the case of re-verification after a correction in the spelling. If the relocation key RELOC has not been actuated either, a step M12 executes a key input process, such as a cursor movement, a character insertion or deletion or conversion for correcting the erroneous spelling. As explained in the foregoing, this operating mode allows the operator to verify the spelling at an arbitrary timing.

Automatic Verification Mode

FIG. 7 is a flow chart showing the process when the lever switch of the keyboard 10 is positioned at an automatic verify mode AV. An automatic verify program (AV) is selected in the ROM 12 by a mode selection signal from the keyboard 10 shown in FIG. 3. In this operating mode, the spelling verification is automatically executed for each word, identified by the actuation of the SPACE key. Also in this operating mode, the spelling verification is conducted, in response to the actuation of the verification key VER by the operator, for a word entered immediately before. In this case the VER key has the function of forcedly dividing a word independently from the SPACE key, and can be conveniently used for dividing a word at an arbitrary position.

Reference is now made to FIG. 7, in which the same steps as those in FIG. 6 are represented by the same symbols and will be omitted from the following explanation. As explained before, the spelling verification in the automatic verify mode AV is conducted for every word, which is identified by detecting the actuation of the SPACE key. Thus, a step A1 identifies if the SPACE key has been actuated, and, if not, the program returns to the step M1 for awaiting the next key entry. On the other hand, if the SPACE key has been actuated, the program proceeds to a step A2 for identifying whether the flag buffer IDFB contains a flag C. If a flag C is present, indicating that the SVCC 157 has identified the immediately preceding word as a determined abbreviation preceding for example a human name, the program proceeds to a step A3 which returns the content of the flag buffer IDFB to A without any spelling verification, since the human name immediately following the abbreviation is not suitable for search in the dictionary. However certain proper nouns, for example names of places such as Tokyo, can be processed in the same manner as ordinary words. If the flag C is absent in the step A2, indicating that the entered word is an ordinary word, the program proceeds to a step M4 to thereafter follow the same flow as explained in relation to FIG. 6.

The data transfer to the text buffer TB in the present operating mode is effected by accumulating character code data of a line in the line buffer LB.

Though not illustrated, it is also possible to dispense with the spelling verification for any word with a certain number of characters or less, since the errors in spelling are quite few in the shorter words such as an "an", "I", "he" etc. Such control can be realized with a criterion that the number of characters does not exceed a certain value.

Automatic Verification and Conversion Mode

FIG. 8 is a flow chart showing the process when the lever switch of the keyboard 10 is positioned at the automatic verification and conversion mode AVC. In this mode, an AVC program is selected in the ROM 12 and activated by a mode selection signal from the keyboard 10 shown in FIG. 3. Referring to FIG. 8, the same steps as those in FIGS. 6 and 7 are represented by the same symbols and will be omitted from the following description. In this operating mode, the spelling verification is automatically effected for any word, which is identified by the actuation of the SPACE key, and the word confirmed by verification is converted into a corresponding identification code ID and stored in the text buffer TB. Also as in the foregoing modes, in response to the actuation of the VER key by the operator, characters entered immediately before are considered as a word and the spelling verification is effected for said word.

One of the features of this operating mode is that, in case a step A2 identifies an immediately preceding word as a certain abbreviation which precedes a human name, the program proceeds to a step C1 to transfer a symbol '*' the content of the character counter CC and the content of the word buffer WB to the text buffer TB. Since a human name cannot be converted into an identification code, it is stored in the text buffer in the form. of character codes. The mark '*', and the number of characters are attached in order to facilitate later recognition by the CPU 11. As explained before, popular names of places or the like can be incorporated in the dictionary memory 155 since they can be searched in the dictionary. Also the dictionary memory 155 may partly contain a random access memory for registering suitable data by the operator.

Another feature of this operating mode is that, when a step M6 identifies that the flag buffer does not contain F, meaning that the searched word has been found in the dictionary, the program proceeds to a step C2 to transfer the word identification code ID in the buffer IDB to the text buffer TB. For this purpose, a step T1 executed by the CPU 152 of the SVCC transfers the identification code ID of the word, confirmed by verification in the dictionary, to the buffer IDB. With the progress of the key entry process in this manner, the text buffer TB will contain text data consisting assembled character codes and identification codes ID obtained by code conversion.

Print Mode

Figure 9:
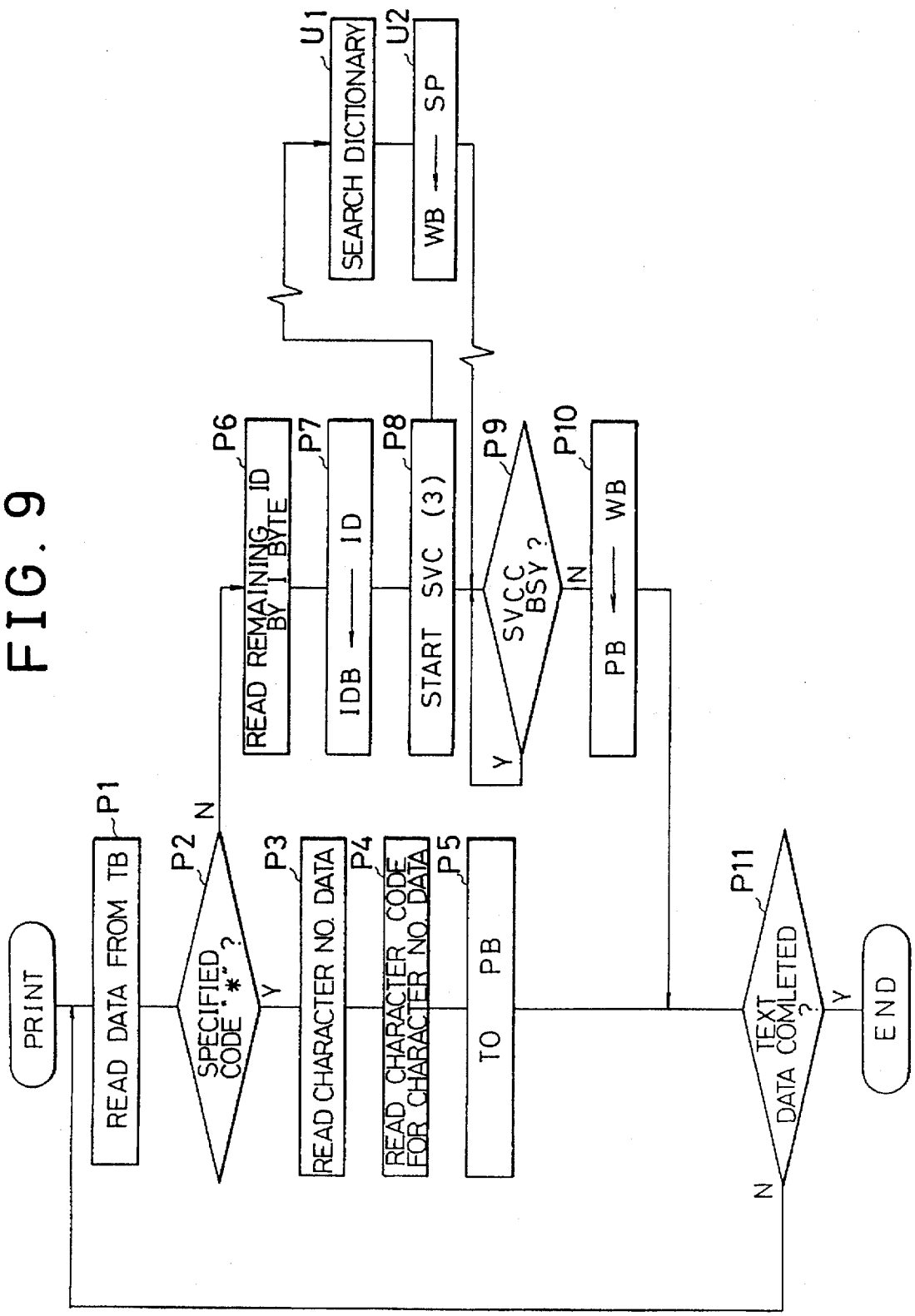
FIG. 9 is a flow chart showing a process for printing text data stored in the text buffer TB.

FIG. 9 is a flow chart showing the process of printing the text data stored in the text buffer TB. A step P1 reads data of 1 byte from the text buffer TB. Then a step P2 identifies whether the data consist of a particular code '*'. If so, the text buffer TB contains data on the number of characters and data on the word. Thus a step P3 reads the data on the number of characters, then a step P4 reads character codes of the number and a step P5 transfers the data of the thus read word to the print buffer PB. The data thus transferred into the print buffer PB are printed according to another unrepresented program of the electronic typewriter. A step P11 inspects an end code to identify whether the entire text data are processed, and, if not, the program returns to the step P1. On the other hand, if the entire text data have been processed, the printing routine is terminated.

In case the particular code '*' is not found in the step P2, a step P6 reads a succeeding identification code of 1 byte, and a step P7 transfers it to the buffer IDB of the SVCU 15. Then a step P8 releases an instruction 'start SVCC(3)', and a step P9 awaits the completion of execution by the SVCC 157. On the other hand, a step U1 executed by the CPU 152 of the SVCC 157 performs a search of the identification code ID in the dictionary, and, upon finding a coinciding code, reads the spelling SP of a corresponding word, and a step U2 transfers the spelling to the word buffer WB. When a step P9 identifies that the SVCC is no longer busy, the CPU 152 of the electronic typewriter transfers, in a step P10, the content of the word buffer WB to the print buffer PB. The content of the word buffer WB can also be transferred to the display buffer for display on the display unit 9.

As explained in the foregoing, the present invention not only allows one to significantly reduce the capacity of text memory but also is easily adaptable to the word processing of specific or technical fields through the use of a dictionary of ordinary words, since the words present in the dictionary are stored after conversion into word identification codes of shorter length while the words not present in the dictionary are stored in the form of characters.

Also the present invention provides a word processor an improved cost performance, since a dictionary memory can be used in various modes by switch means according to the purpose of use, such as a spelling verification mode for every entered word, or a compression mode for text information by conversion into word identification codes.

Furthermore the present invention allows one to significantly reduce the capacity of the text memory by converting each key-entered word into a shorter identification code of a determined length for storage in the text memory, and it is therefore rendered possible to realize a smaller dimension and a lower cost for example in the case of providing a conventional electronic typewriter with a spelling verification function.

Furthermore the present invention allows one to store text information of a large amount in a memory of a limited capacity, and such storage is advantageous for data storage in an external memory medium and realizes data communication with another equipment within a shorter time.

Furthermore the present invention enables one to dramatically improve the operability of the apparatus, since words not present in the dictionary, particularly proper nouns such as human names, are automatically distinguished and excluded from the spelling verification.

Furthermore the present invention allows one to the significantly reduce the capacity of text memory and to improve its operability, even through the use of a dictionary containing ordinary words only, since the words present in the dictionary are converted into identification codes of a determined length and as stored, while the words not present in the dictionary, particularly proper nouns such as human names, are automatically distinguished and stored in the form of character codes.

It is further rendered possible to provide an apparatus with improved operability, through the use of separate control units for the word processing and for the spelling verification, thus exploiting maximum functions thereof at a high speed.

What is claimed is:

1. A document processing apparatus comprising:
   input means for inputting a word;
   first instruction means for instructing a verification of the spelling of the word input by said input means;
   verification means for verifying the spelling of the input word in response to an instruction given by said first instruction means;
   first control means for placing said input means in an inhibited condition where inputting of a next word is inhibited responsive to a verification result by said verification means indicating that the input word is incorrectly spelled, and placing said input means in a condition where inputting of a next word is permitted responsive to a verification result by said verification means indicating that the input word is correctly spelled;
   correction means for correcting the spelling of the input word while said first control means places said input means in the inhibited condition;
   second instruction means for instructing a verification of the spelling of the input word corrected bY said correction means;
   second control means for controlling said verification means to verify the spelling of the input word corrected by said correction means, in response to an instruction given by said second instruction means;
   third instruction means for instructing the release of said input means from the inhibited condition; and
   third control means for controlling said first control means to release said input means from the inhibited condition in response to the instruction given by said third instruction means.

2. An apparatus according to claim 1, wherein said input means comprises a keyboard.

3. An apparatus according to claim 1, wherein said first control means places said input means in the inhibited condition by performing a margin stop operation.

4. An apparatus according to claim 1, wherein said first instruction means comprises a verification key or a space key and wherein said second instruction means comprises a relocation key and wherein said third instruction means comprises a margin release key.

5. An apparatus according to claim 1, further comprising means for printing the document data input by said input means.

6. A document processing method comprising the steps of:
   inputting a word with input means;
   a first instructing step of instructing a verification of the spelling of the word;

a verifying step of verifying the spelling of the input word in response to an instruction given in said first instructing step;

placing the input means in an inhibited condition where the inputting of next word is inhibited in response to said verifying step verifying that the word is incorrectly spelled and placing the input means in a condition where the inputting of a next word is permitted in response to said verifying step verifying that the input word is correctly spelled;

correcting the spelling of the input word while said placing step places the input means in the inhibiting condition;

a second instructing step of instructing a verification of the spelling of the input word corrected by said correcting step;

controlling said verifying step to verify the spelling of the input word corrected by said correcting step, in response to an instruction given in said second instructing step;

a third instructing step instructing the release of the input means from the inhibiting condition; and controlling said placing step to release the input means from the inhibited condition in response to the instruction given by said third instructing step.

7. A method according to claim 6, wherein said inputting step inputs the document data with a keyboard.

8. A method according to claim 6, wherein said placing step places the input means in the inhibited condition by performing a margin stop operation.

9. A method according to claim 6, wherein said first instructing step instructs the verification of the spelling of the input word with a verification key or a space key, and wherein said second instructing step instructs the verification of the spelling of the input word with a relocation key, and wherein said third instructing step instructs the release of the input means from the inhibiting condition with a margin release key.

10. A method according to claim 6, further comprising the step of printing the input document data.

\* \* \* \* \*

UNITED STATES PATENT AND TRADEMARK OFFICE
CERTIFICATE OF CORRECTION

PATENT NO. : 5,675,821  
DATED : October 7, 1997  
INVENTOR(S) : Masaru MAKITA

Page 1 of 3

It is certified that error appears in the above-identified patent and that said Letters Patent is hereby corrected as shown below:

ON THE COVER PAGE

Above item [57] Abstract:

Insert --Attorney, Agent or Firm - Fitzpatrick, Cella, Harper & Scinto--.

Column 1:

Line 28, "its is entered each "should read --it is entered. Each--.
Line 31, "has" should read --requires--.

Column 2:

Line 48, "10" should be deleted.
Line 63, "composed-" should read --composed--.
Line 64, ".for" should read --for--.

UNITED STATES PATENT AND TRADEMARK OFFICE
CERTIFICATE OF CORRECTION

PATENT NO. : 5,675,821
DATED : October 7, 1997
INVENTOR(S) : Masaru MAKITA

It is certified that error appears in the above-identified patent and that said Letters Patent is hereby corrected as shown below:

Column 3:

Line 9, "firstthree" should read --first three--.
Line 17, "represent" should read --represents--.
Line 26, "the key." should read --this key.--.
Line 32, "MARREL" should read --MAR REL--.
Line 42, "automatical" should read --automatically--.
Line 50, "is" should read --are--.

Column 5:

Line 25, "electrOnic" should read --electronic--.
Line 59, "mark "*"" should read --mark "*",--.
Line 64, "illustraged" should read --illustrated--.

Column 6:

Line 6, "attention" should read --the attention--.

Column 7:

Line 2, "SVCC157" should read --SVCC 157--.
Line 15, "resets" should read --reset--.

UNITED STATES PATENT AND TRADEMARK OFFICE
CERTIFICATE OF CORRECTION

PATENT NO. : 5,675,821
DATED : October 7, 1997
INVENTOR(S) : Masaru MAKITA

It is certified that error appears in the above-identified patent and that said Letters Patent is hereby corrected as shown below:

Column 8:

Line 46, "symbol '*'" should read --symbol '*',--.

Column 9:

Line 1, "consisting" should read --consisting of--.

Column 10:

Line 6, "as" should read --are--.
Line 37, "bY" should read --by--.

Signed and Sealed this

Ninth Day of June, 1998

*Attest:*

BRUCE LEHMAN

*Attesting Officer*     *Commissioner of Patents and Trademarks*